United States Patent
Mayor (10) Patent No.: US 12,231,023 B2
(45) Date of Patent: Feb. 18, 2025

(54) ENHANCED CONVECTIVE ROTOR COOLING

(71) Applicant: James Rhett Mayor, Braselton, GA (US)

(72) Inventor: James Rhett Mayor, Braselton, GA (US)

( * ) Notice: Subject to any disclaimer, the term of this patent is extended or adjusted under 35 U.S.C. 154(b) by 605 days.

(21) Appl. No.: 15/480,607

(22) Filed: Apr. 6, 2017

(65) Prior Publication Data
US 2017/0338720 A1  Nov. 23, 2017

Related U.S. Application Data

(60) Provisional application No. 62/318,845, filed on Apr. 6, 2016.

(51) Int. Cl.
*H02K 1/32* (2006.01)
*H02K 9/06* (2006.01)
*H02K 9/22* (2006.01)

(52) U.S. Cl.
CPC .............. *H02K 9/06* (2013.01); *H02K 1/32* (2013.01); *H02K 9/227* (2021.01)

(58) Field of Classification Search
CPC .. H02K 1/32; H02K 5/18; H02K 5/20; H02K 9/00; H02K 9/005; H02K 9/02; H02K 9/04; H02K 9/06; H02K 9/22; H02K 17/16; H02K 17/165; H02K 17/18; H02K 17/185; H02K 17/20; H02K 17/205
USPC .............. 310/125, 211, 212, 156.78, 156.79, 310/156.81
See application file for complete search history.

(56) References Cited

U.S. PATENT DOCUMENTS

| 2,617,052 | A | * | 11/1952 | Bessiere | ............... | H02K 49/00 |
| | | | | | | 310/93 |
| 5,744,880 | A | * | 4/1998 | Kudoh | ..................... | H02K 5/20 |
| | | | | | | 310/58 |
| 2002/0047343 | A1 | * | 4/2002 | Kawamura | ............... | H02K 9/06 |
| | | | | | | 310/60 R |
| 2004/0150270 | A1 | * | 8/2004 | Nagayama | ............ | H02K 5/207 |
| | | | | | | 310/59 |

(Continued)

FOREIGN PATENT DOCUMENTS

| JP | 2000083350 A | * | 3/2000 |
| JP | 2007124796 A | * | 5/2007 |

OTHER PUBLICATIONS

Ohashi, Machine Translation of JP2000083350, Mar. 2000 (Year: 2000).*

(Continued)

*Primary Examiner* — Eric Johnson
(74) *Attorney, Agent, or Firm* — IP Strategies (57) ABSTRACT

According to various aspects, exemplary embodiments of an electric motor are provided herein. In one embodiment of this disclosure, an electric motor includes a rotor, at least one end of the rotor includes at least one blade and at least one array of micro-features, wherein heat generated by the rotor is dissipated by the at least one blade and the at least one array of micro-features.

In another embodiment, a method of manufacturing an electric motor having a rotor, the method comprising machining a piece of conductive material to create micro-features on at least one end of the conductive material; and inserting the conductive material into the rotor.

14 Claims, 12 Drawing Sheets

(56) References Cited

U.S. PATENT DOCUMENTS

| | | | |
|---|---|---|---|
| 2013/0217317 A1* | 8/2013 | Baumeister | H02K 9/22 454/254 |
| 2014/0042840 A1* | 2/2014 | Chamberlin | H02K 9/22 310/52 |
| 2014/0225481 A1* | 8/2014 | Murphy | H02K 9/06 310/60 R |
| 2016/0329760 A1* | 11/2016 | Major | H02K 15/12 |
| 2016/0352201 A1* | 12/2016 | Ranjan | H02K 9/06 |

OTHER PUBLICATIONS

Yagi, Machine Translation of JP2007124796, May 2007 (Year: 2007).*

* cited by examiner

ENHANCED CONVECTIVE ROTOR COOLING

RELATED APPLICATION DATA

This application claims priority from U.S. Provisional Patent Application No. 62/318,845, which was filed on Apr. 6, 2016, which application is hereby incorporated herein by reference in its entirety.

BACKGROUND

Electric motors typically include two parts, a rotor and a stator. The stator is a stationary component, while the rotor rotates based on the relationship between the magnetic fields of the rotor and stator. The magnetic fields of the stator and rotor can be created in different ways including installing conductive windings around the teeth of a stator or rotor, using permanent magnets on rotors or stators, or employing rotor bars which are made of a conductor such as aluminum or copper.

During operation, the rotor and stator generate heat, which if not dissipated, can lead to motor failure. In induction machines where rotor bars are employed, some designs include end rings on each end of the rotor. The end rings can include molded tabs, which are referred to as wafters. As the rotor rotates, heat will generate in the rotor bars. Because the wafters are molded on the end rings, the wafters will rotate along with the rotor and will work to cool the rotor bars and the end windings of the stator.

In this setup, there are disadvantages. First, where the rotor includes rotor bars of aluminum or copper, heat generated in the rotor can move to the ends of the rotor because these materials are good thermal conductors. But for rotors constructed out of materials that are not good thermal conductors, such as permanent magnets, this design is not effective because it cannot effectively draw out the heat generated by the magnetics. Moreover, the wafters described herein, are not optimal; cooling of electric motors, including induction machines, can be enhanced. And this is desirable because enhanced cooling will allow the motor to receive more current and produce a higher power output.

SUMMARY

According to various aspects, exemplary embodiments of an electric motor are provided herein. In one embodiment of this disclosure, an electric motor includes a rotor, at least one end of the rotor includes at least one blade and at least one array of micro-features, wherein heat generated by the rotor is dissipated by the at least one blade and the at least one array of micro-features.

In another embodiment, a method of manufacturing an electric motor having a rotor, the method comprising machining a piece of conductive material to create micro-features on at least one end of the conductive material; and inserting the conductive material into the rotor.

According to another embodiment, a method of manufacturing an electric motor having a rotor, the method comprising pouring and casting a piece of conductive material into the rotor, with the casting forming the conductive material into a conductive material having at least one end, wherein the at least one end includes micro-features.

DETAILED DESCRIPTION

Figure 1:
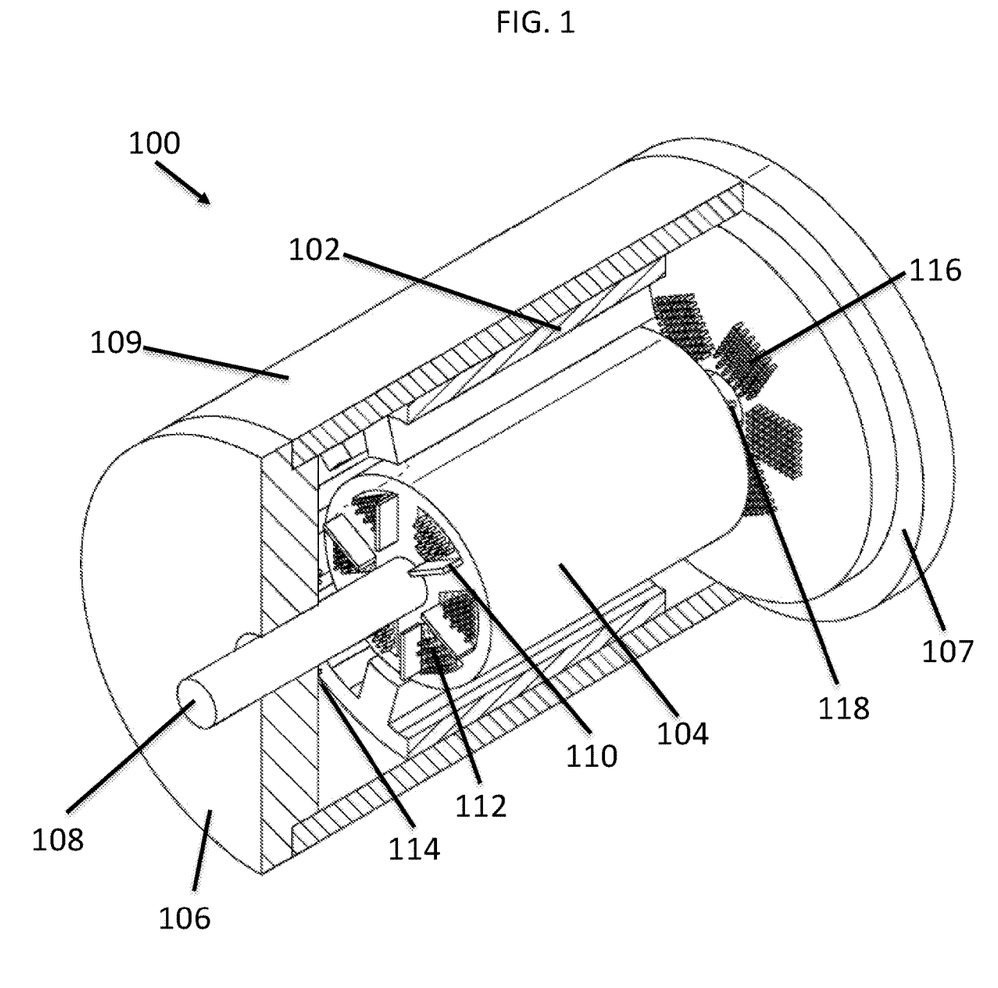
FIG. 1 is a perspective view of an electric motor.

FIG. 1 is a perspective view of an electric motor 100. The electric motor 100 includes a stator 102, a rotor 104, end caps 106 and 107, a shaft 108 to which the rotor 104 delivers torque during operation, and a casing 109. The left end of the rotor includes a plurality of blades 110 in between which are a plurality of arrays of micro-features 112. Each of the arrays includes projections that are arranged in a trapezoidal fashion, but can be in other configurations such as rectangular, circular, or triangular. The configurations could also be staggered or aligned. The projections of the micro-features 112 have a circular cross-section, but the cross-section of the micro-features 112 could be other shapes such as rectangular, circular, ovular, rhomboidal, or the shape of a hydrofoil or an airfoil. The right side of the rotor 104 also includes a plurality of blades 118 and a plurality of arrays of micro-features, which cannot be observed in this perspective view but will be shown in subsequent figures. Each array of micro-features 112 on the left side of the rotor 104 corresponds with an array of micro-features on the right side of the rotor. Specifically, each corresponding pair of micro-feature arrays are two ends of an insert made of conductive material, referred to herein as a spreader and described in more detail below. In the embodiment of FIG. 1, there are six spreaders inserted into the rotor 104, and as a result, there are six corresponding pairs of micro-feature arrays. Additionally, the blades 110 and 118 can be integral with the spreaders, or alternatively the blades 110 and 118 can be integral with the rotor 104. The blades 110 and 118 could also be discrete components attached to either the rotor 104 or the spreaders.

The end caps 106 and 107 includes a plurality of arrays of micro-features 114 and 116 respectively. Each array of micro-features 114 and 116 is arranged in a rectangular fashion but can be in other configurations such as circular, triangular, or trapezoidal. Like the micro-features 112, the micro-features 114 and 116 have a circular cross-section, but the cross-section of the micro-features 114 and 116 could be other shapes such as rectangular, circular, ovular, or rhomboidal.

During operation of the motor 100, the rotor 104 rotates and because the blades 110 and 118 and the micro-features 112 (and the corresponding micro-features on the right side of the rotor) are on the rotor, they also will rotate. Overtime, the rotor and stator will generate heat. The heat generated by the rotor will be conducted to the ends of the rotor 104 via the spreader. When the heat reaches the ends of the rotor, the blades 110 and 118 and the micro-features 112 (and the corresponding micro-features on the right side of the rotor 104) will cool the rotor and stator by dissipating the heat generated in the rotor.

More specifically, the rotation of the blades 110 and 118 causes an axisymmetric circulation of air that goes from the rotor 104, to the stator 102, to the end caps 106 and 107, and back to the rotor 104. In this circulation, the heat from the rotor gets dissipated by flowing from the rotor along the described axisymmetric circulation. When the heat reaches the end caps 106 and 107, the micro-features 114 and 116 of the end caps will cause the heat to dissipate to the ambient air outside the motor 100.

The micro-features described enhance the cooling of the motor 100. As described, heat generated by the rotor 104 will be thermally conducted to the ends of the rotor 104 via the spreaders. The blades 110 and 118 generate the axisymmetrical circulation of air, which will flow in between the gaps of, and around individual micro-features. The surface of the micro-features increases the area of the ends of the rotor (where generated heat is conducted to via the spreaders) and the flow of the circulating air increases its velocity as it flows in between and around individual micro-features. The increase in area and velocity enhances the heat dissipation from the rotor 104.

Similarly, when the heat dissipated from the rotor flows along the axisymmetric airflow and reaches the micro-features 114 and 116 on the end caps 106 and 107, the micro-features 114 and 116 will enhance the cooling of the motor 100 by dissipating the heat out to the ambient air outside the motor 100 due to the surface area of the micro-features and the increased velocity of the air flow in between and around the micro-features.

The arrangement of micro-features and blades described are useful in rotors that comprise permanent magnets. In permanent magnet machines, magnets can generate heat through eddy currents. These eddy currents generate heat on the magnets that can degrade their function. One problem is that magnets are not good thermal conductors, so the generated heat tends to stay with the magnet. When used in permanent magnet machines, the spreader acts as a thermal capacitance that conducts the heat from the magnets and moves it to the ends of the rotor, where it is dissipated as described.

Figure 2:
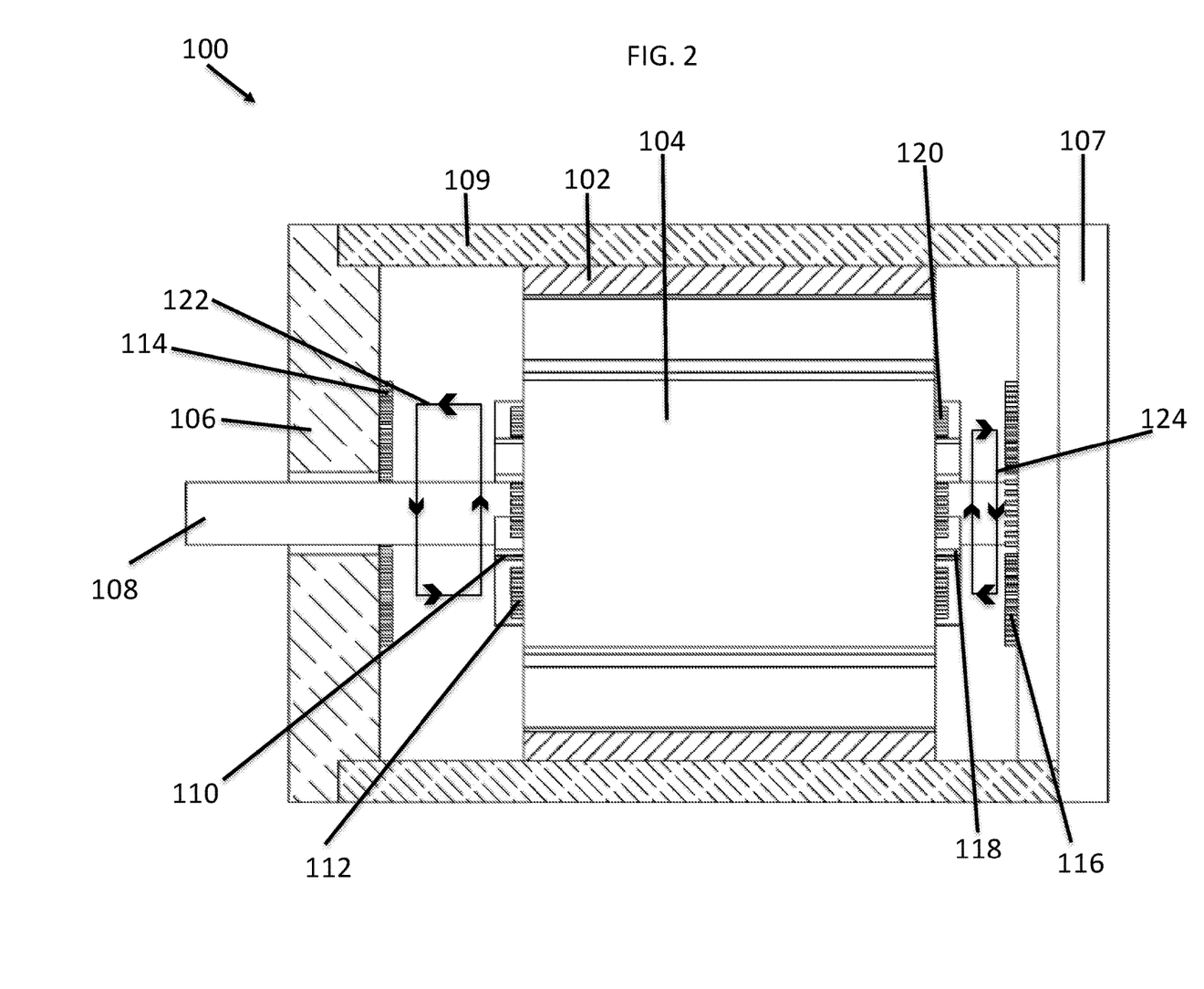
FIG. 2 is a side view of an electric motor.

FIG. 2 is a side view of motor 100 so that internal parts of the motor 100 can be observed. FIG. 2 illustrates the stator 102, a rotor 104, end caps 106 and 107, a shaft 108, and a casing 109. On the left side of the rotor are blades 110 and micro-features 112, and on the right side of the rotor are blades 118 and micro-features 120. On the end caps 106 and 107 are micro-features 114 and 116 respectively. FIG. 2 shows arrows 122 and 124 which illustrate the generally axisymmetric circulation created by the blades 110 and 118.

Figure 3:
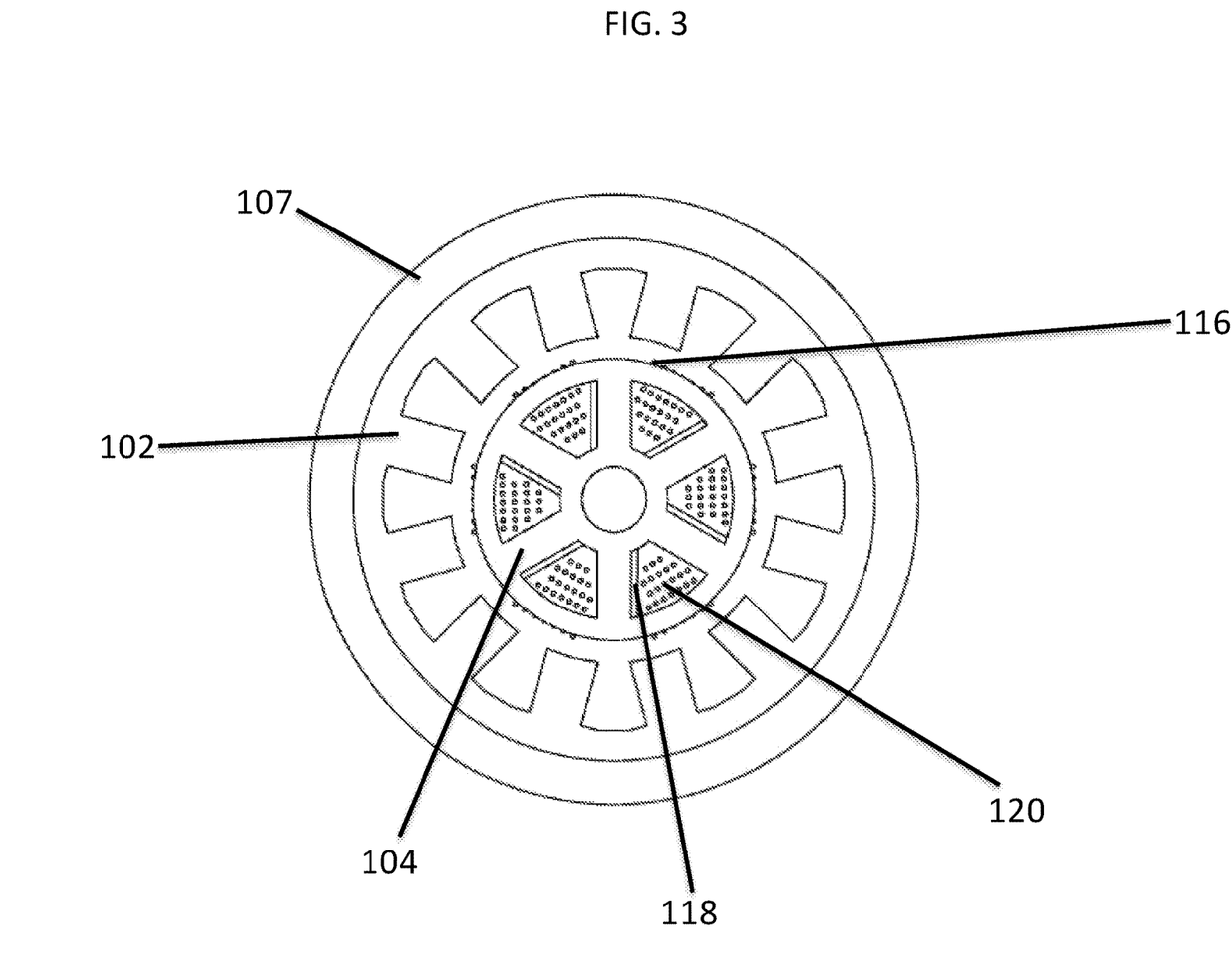
FIG. 3 is an axial view of components of an electric motor.
Figure 4:
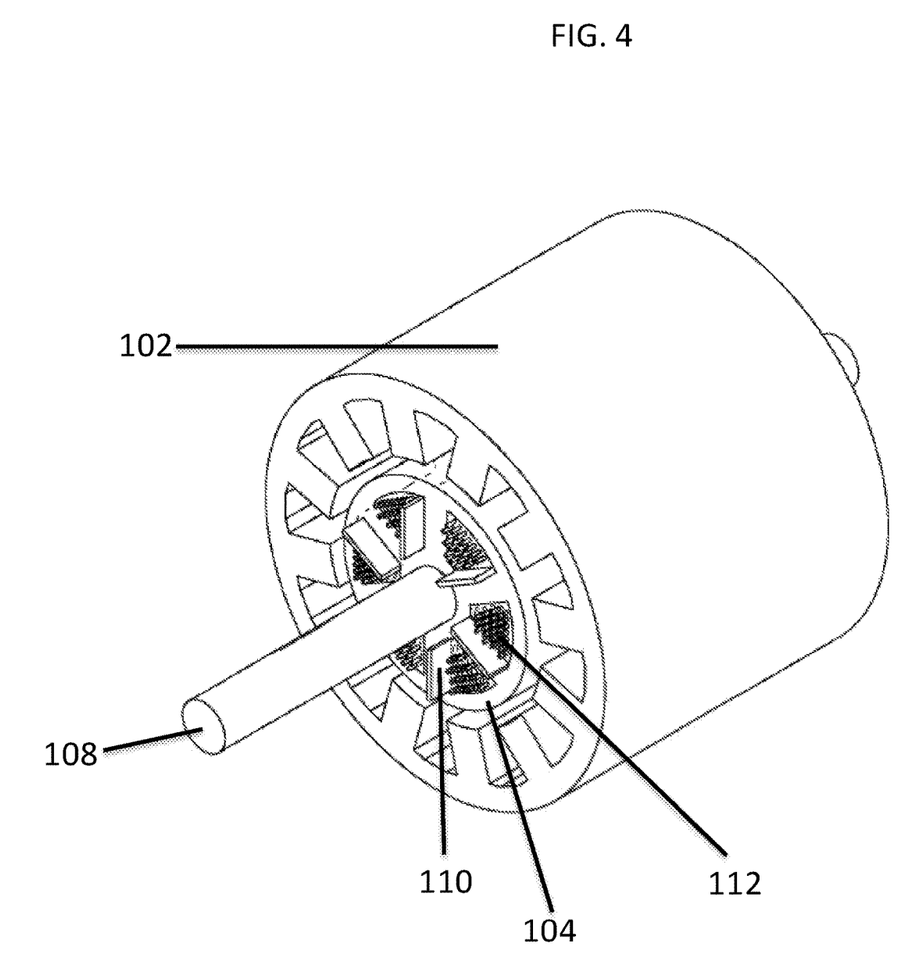
FIG. 4 is a perspective view of components of an electric motor.

FIG. 3 is an axial view of components of the electric motor 100. This figure shows the stator 102 inside of which is the rotor 104. One of the ends of the rotor 104 includes blades 110 and micro-features 112. FIG. 3 also shows end cap 107 having micro-features 116. FIG. 4 is a perspective view of components of the electric motor 100. This figure shows the stator 102, rotor 104, and the shaft 108. On the rotor 104 are the blades 110 and micro-features 112.

Figure 5:
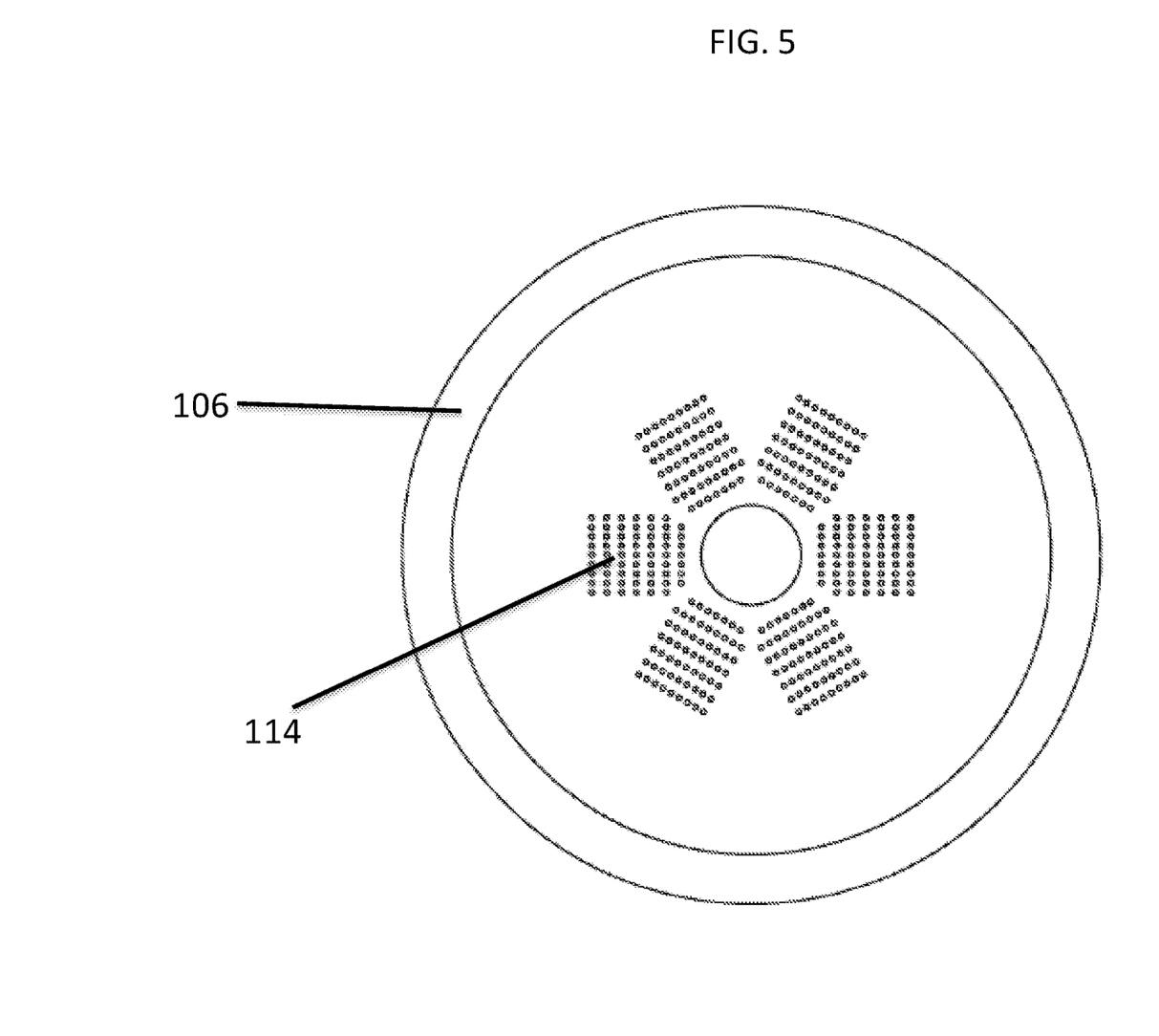
FIG. 5 is an axial view of an end cap of an electric motor.
Figure 6:
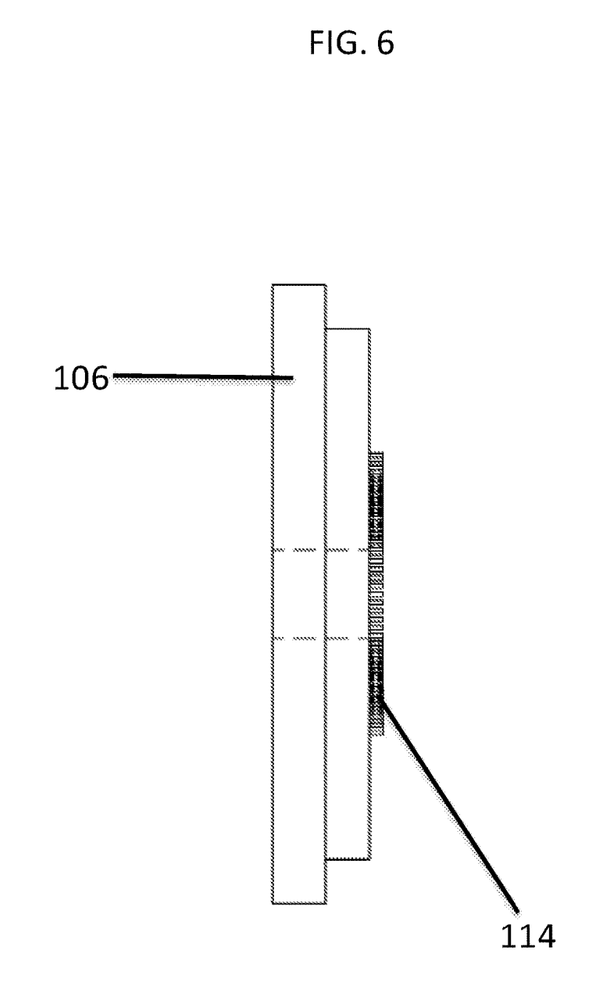
FIG. 6 is a side view of an end cap of an electric motor.
Figure 7:
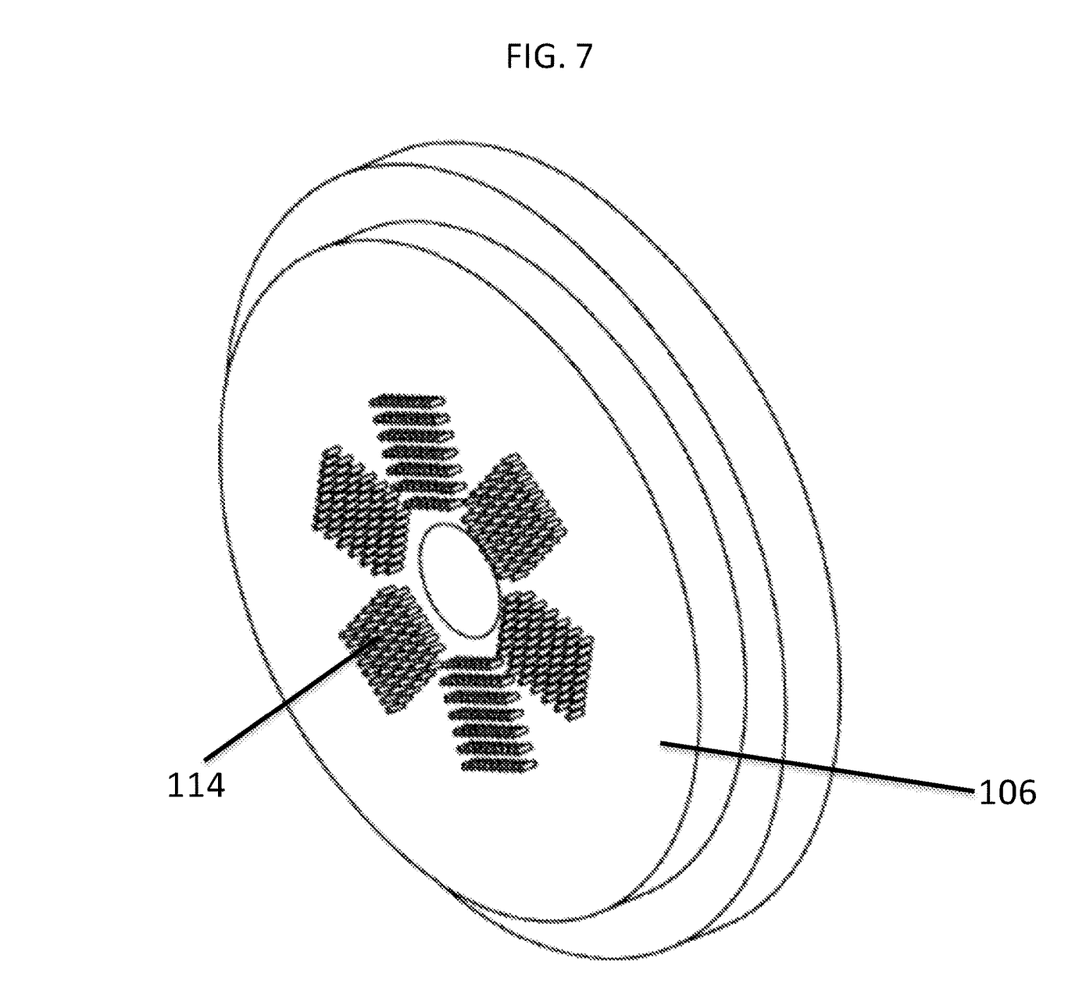
FIG. 7 is a perspective view of an end cap of an electric motor.

FIG. 5 is an axial view of end cap 106 and FIG. 6 is a side view of end cap 106. FIG. 5 shows the array of micro-features 114 and FIG. 6 shows from the side, the projection of the micro-features 114. FIG. 7 shows the micro-features on the end cap 106 from a perspective view, showing micro-features 114.

Figure 8:
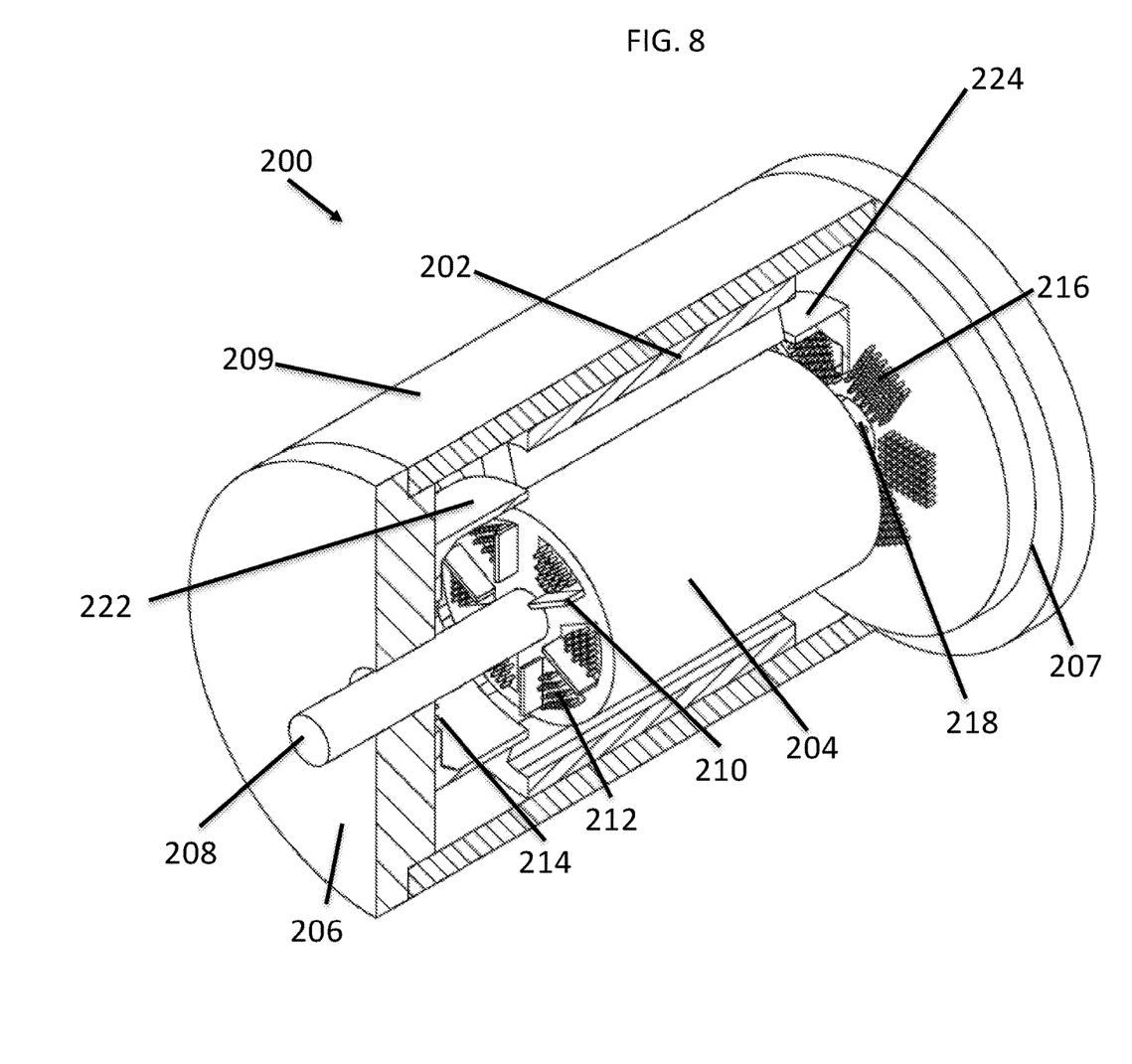
FIG. 8 is a perspective view of an electric motor.

FIG. 8 is a perspective view of an electric motor 200. The electric motor 200 includes a stator 202, a rotor 204, end caps 206 and 207, a shaft 208 to which the rotor 204 delivers torque during operation, and a casing 209. The left end of the rotor includes a plurality of blades 210 in between which are a plurality of arrays of micro-features 212. Each of the arrays include projections that are arranged in a trapezoidal fashion, but can be in other configurations such as rectangular, circular, or triangular. The projections of the micro-features 212 have a circular cross-section, but the cross-section of the micro-features 212 could be other shapes such as rectangular, circular, ovular, or rhomboidal. The right side of the rotor 204 also includes a plurality of blades 218 and a plurality of arrays of micro-features, which cannot be observed in this perspective view. The micro-features on the right side of the rotor 204 are symmetrical to those on the left side, as described in FIG. 1. Each array of micro-features 212 on the left side of the rotor 204 corresponds with an array of micro-features on the right side of the rotor. Specifically, each corresponding pair of micro-feature arrays are two ends of an insert made of conductive material, referred to herein as a spreader and described in more detail below. In the embodiment of FIG. 8, there are six spreaders inserted into the rotor 204, and as a result, there are six corresponding pairs of micro-feature arrays. Additionally, the blades 210 and 218 can be integral with the spreaders, or alternatively the blades 210 and 218 can be integral with the rotor 204. The blades 210 and 218 could also be discrete components attached to either the rotor 204 or the spreaders.

The end caps 206 and 207 includes a plurality of arrays of micro-features 214 and 216 respectively. Each array of micro-features 214 and 216 is arranged in a rectangular fashion but can be in other configurations such as circular, triangular, or trapezoidal. Like the micro-features 212, the micro-features 214 and 216 have a circular cross-section, but the cross-section of the micro-features 214 and 216 could be other shapes such as rectangular, circular, ovular, or rhomboidal.

During operation, the heat generated in rotor 204 is conducted to the ends of the rotor via the spreaders wherein the heat is dissipated via the blades and micro-features on the rotor 204, similar to that described in FIG. 1. In FIG. 8, however, the motor 200 also includes ducts 222 and 224. During operation, the blades 210 and 218 rotate to create a circulation of air. In FIG. 1, the circulation created by the blades directed airflow axisymmetrically from the rotor to the stator and then to the end caps. In the embodiment in FIG. 8, the circulated air does not flow to the stator due to the ducts 222 and 224. Instead, in FIG. 8, due to the ducts, the air circulates from the rotor 204 to the end caps 206 and 207. With the ducts 222 and 224, there is a close coupling convection between the rotor 204 and the end caps 206 and 207 such that the heat dissipated from the rotor 204 is directed to the micro-features 214 and 216 of the end caps 206 and 207.

Figure 9:
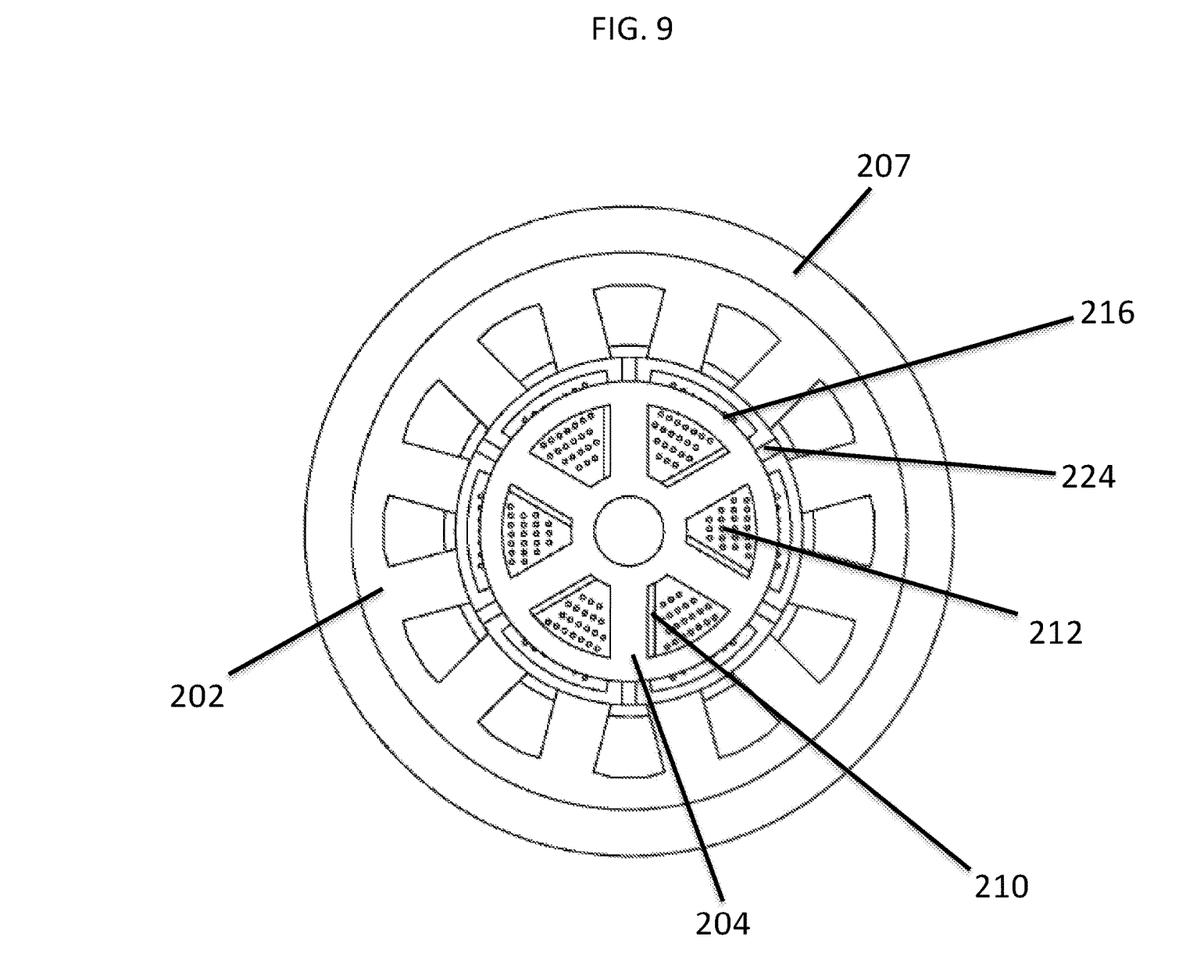
FIG. 9 is an axial view of components of an electric motor.

FIG. 9 is an axial view of components of the electric motor 200. This figure shows the stator 202 inside of which is the rotor 204. One of the ends of the rotor 204 includes blades 210 and micro-features 212. FIG. 9 also shows the duct 224 and end cap 207 having micro-features 216.

Figure 10:
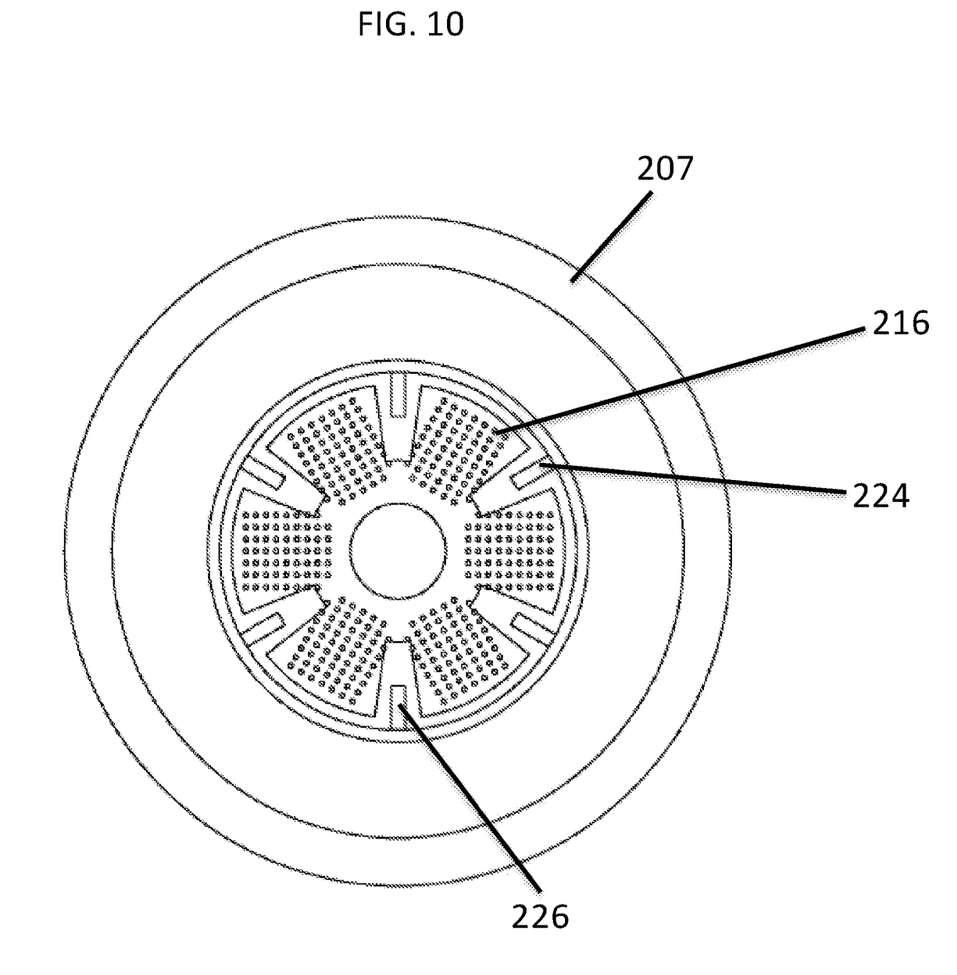
FIG. 10 is an axial view of components of an electric motor.

FIG. 10 is another axial view of components of the electric motor 200, which shows the end cap 207 having micro-features 216, and also shows the duct 224. The duct 224 includes ribs 226. The ribs 226 provide structural support for the duct 224 and also direct airflow to the micro-features 216. During operation, some of the air flow from the rotor (via the blades 210 and 218) will contact the ribs 226 at which point the ribs 226 will assist in direct the airflow to the micro-features 216. The ribs 226, therefore, increase the efficiency of the heat transfer from the rotor to the end caps and ultimately out of the motor 200. While end cap 207 is shown in FIG. 10, it will be appreciated that ribs, like ribs 226, can be included on duct 222 on end cap 206.

Figure 11:
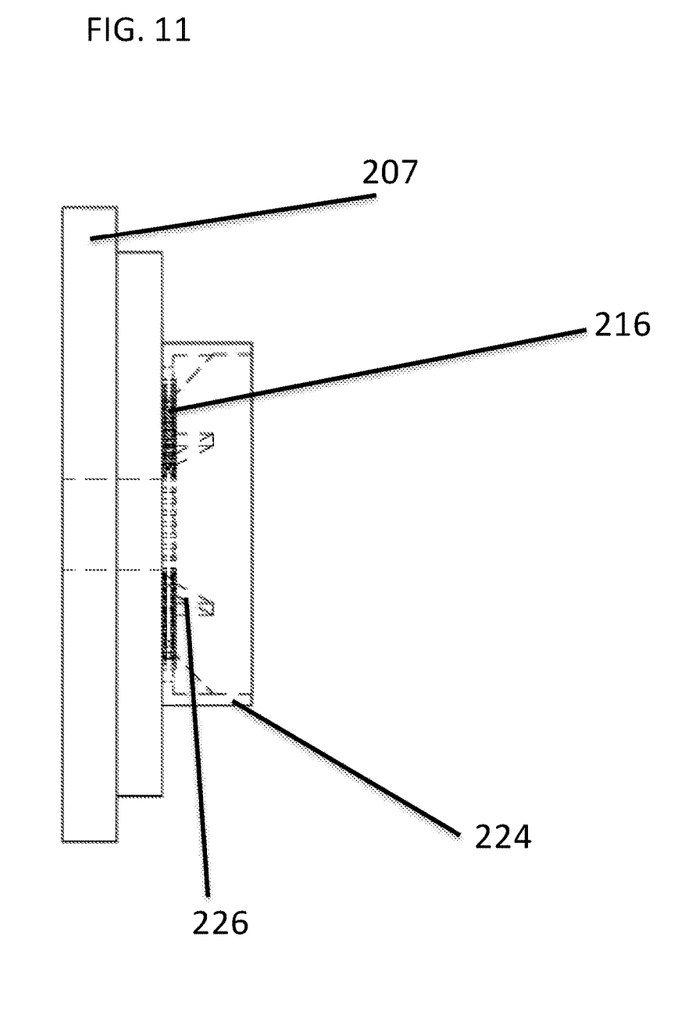
FIG. 11 is a side view of components of an electric motor.
Figure 12:
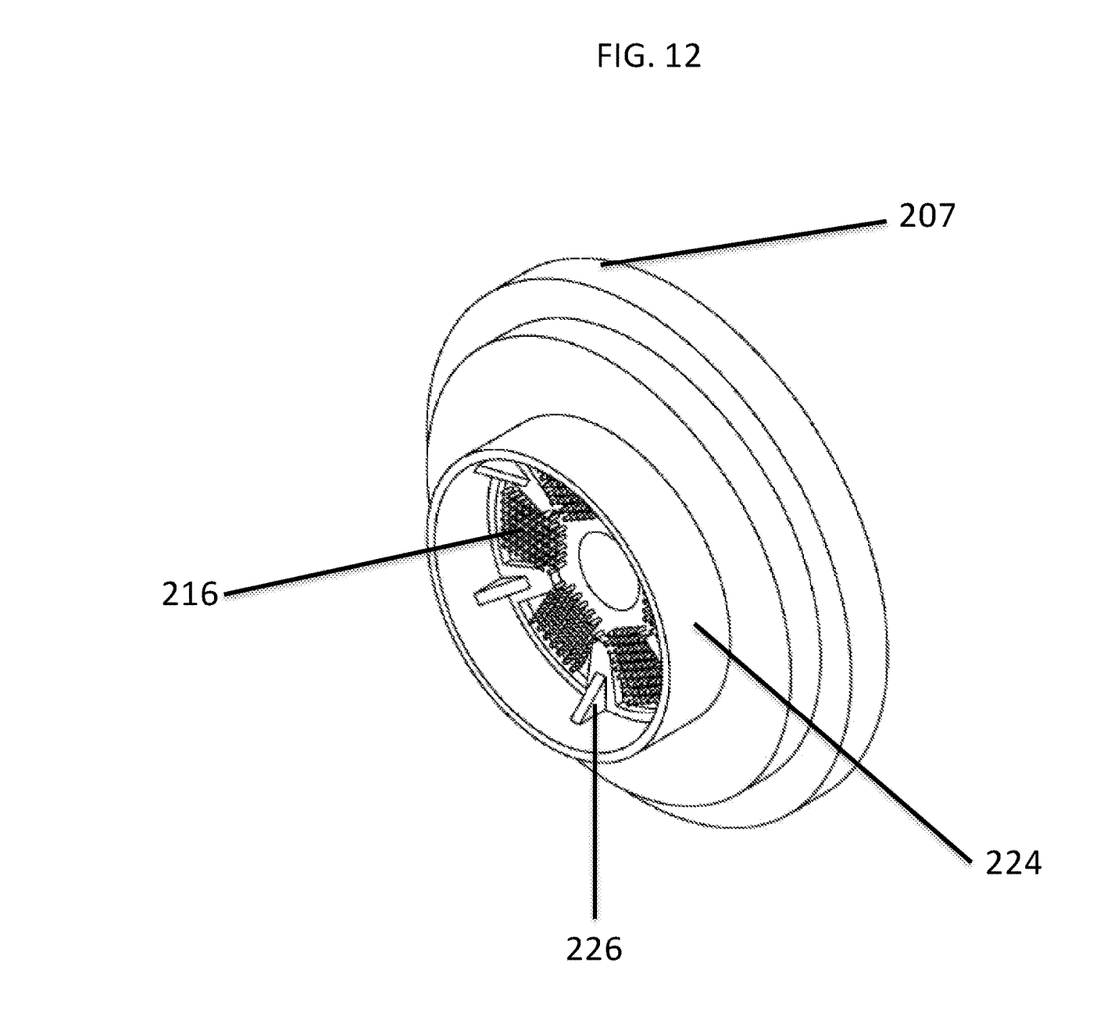
FIG. 12 is a perspective view of components of an electric motor.

FIG. 11 is a side view of the end cap 207 showing the micro-features 216 and duct 224 and ribs 226, and FIG. 12 is a perspective view showing these features. The ribs 226 are triangular, but it will be appreciated that other geometries such as cubical or pyramidal can be applied without departing from the scope of this disclosure.

The rotors described herein may be manufactured where the spreaders are machined to include the micro-features on each end; alternatively the micro-features and the spreader could be integrally casted, where the conductive material that forms the spreader and micro-features is poured and casted directly in the rotor.

The features described herein can be applicable to electic machines, including without limitations, induction machines, permanent magnet machines (including those that use segmented magnets or an array of segmented magnets), switch-reluctance machines, and field wound synchronous machines.

While embodiments have been illustrated and described herein, it is appreciated that various substitutions and changes in the described embodiments may be made by those skilled in the art without departing from the spirit of this disclosure. The embodiments described herein are for illustration and not intended to limit the scope of this disclosure. For example, while embodiments described here include micro-features on a rotor and micro-features on one or more end caps, it should be understood that motor design in accordance with the teachings of this disclosure may include micro-features on one or more end caps and no micro-features on the rotor. Alternatively, a motor design in accordance with the teachings of this disclsure may include micro-features on the rotor and not on the one or more end caps.

The invention claimed is:

1. An electric motor comprising:
   a rotor having a first end, the rotor rotating around an axis;
   at least one blade; and
   a plurality of arrays of micro-features;
   wherein the at least one blade and the plurality of arrays of micro-features are located on the first end of the rotor;
   wherein the end of the rotor defines a surface that extends from an inner circumference to an outer circumference, said inner circumference defining an area in which a shaft can be positioned, said outer circumference defining an outer edge of said end of the rotor;
   wherein the at least one blade is positioned on the surface, the blade extending between the inner circumference and the outer circumference, the blade having a height extending outwardly from the surface in an axial direction, and the blade having a width that is less than the length of the inner circumference;
   wherein the plurality of arrays of micro-features are positioned on the surface;
   wherein heat generated by the rotor is dissipated by the at least one blade and the plurality of arrays of micro-features; and
   wherein the rotor includes a plurality of spreaders, each spreader comprises a conductive material, each spreader is configured to be inserted in the rotor, each spreader has an end that forms part of the surface, and the end of each spreader has one of the plurality of arrays of micro-features.

2. The electric motor of claim 1, wherein the motor includes a plurality of blades, and the rotor further includes a second end, wherein the one of the plurality of arrays of micro-features and one of the plurality of blades is positioned on the second end of the rotor.

3. The electric motor of claim 1 further comprising a first end cap, the first end cap including an array of micro-features.

4. The electric motor of claim 3 further comprising a second end cap, the second end cap including an array of micro-features.

5. The electric motor of claim 1, wherein the electric motor is a permanent magnet machine, wherein the rotor includes at least one permanent magnet segment.

6. The electric motor of claim 5, wherein the permanent magnet machine includes at least two segments.

7. The electric motor of claim 1, wherein the motor is an induction machine.

8. The electric motor of claim 1, further comprising a plurality of blades, positioned on each end of the rotor to waft heat dissipated from the plurality of arrays micro-features.

9. The electric motor of claim 8 wherein the plurality of blades is integral with the spreader.

10. The electric motor of claim 8 wherein the plurality of blades is integral with the rotor.

11. The electric motor of claim 1 wherein the cross-section of the micro-features in the at least one array of micro-features has the shape of an airfoil.

12. The electric motor of claim 1 wherein the cross-section of the micro-features in the at least one array of micro-features has a circular shape.

13. The electric motor of claim 1 wherein the at least one array of micro-features has a trapezoidal shape.

14. The electric motor of claim 1 wherein the at least one array of micro-features has a rectangular shape.

* * * * *